US011403325B2

(12) United States Patent
Ein Dor et al.

(10) Patent No.: US 11,403,325 B2
(45) Date of Patent: Aug. 2, 2022

(54) CLUSTERING ITEMS AROUND PREDEFINED ANCHORS

(71) Applicant: International Business Machines Corporation, Armonk, NY (US)

(72) Inventors: Liat Ein Dor, Tel-Aviv (IL); Dalia Krieger, Tel-Aviv (IL); Yonatan Bilu, Jerusalem (IL); Noam Slonim, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/872,899

(22) Filed: May 12, 2020

(65) Prior Publication Data

US 2021/0357432 A1 Nov. 18, 2021

(51) Int. Cl.
*G06F 16/00* (2019.01)
*G06F 16/28* (2019.01)

(52) U.S. Cl.
CPC ................... *G06F 16/285* (2019.01)

(58) Field of Classification Search
CPC .............................. G06F 16/285; G06F 16/35
USPC ........................................................ 707/737
See application file for complete search history.

(56) References Cited

U.S. PATENT DOCUMENTS

| | | | |
|---|---|---|---|
| 7,870,136 B1 | 1/2011 | Cohen et al. | |
| 9,928,661 B1* | 3/2018 | Kinstner | A63F 13/25 707/707 |
| 9,984,510 B1* | 5/2018 | Kinstner | G06F 3/011 707/707 |
| 2001/0028510 A1* | 10/2001 | Ramm | G01N 21/6452 359/663 |
| 2005/0182764 A1* | 8/2005 | Evans | G06T 11/206 707/999.005 |
| 2009/0132568 A1* | 5/2009 | Syeda-Mahmood | G06N 20/10 707/E17.046 |
| 2014/0079297 A1* | 3/2014 | Tadayon | G06V 40/172 382/118 |
| 2014/0201126 A1* | 7/2014 | Zadeh | A61B 5/165 706/52 |
| 2017/0235848 A1* | 8/2017 | Van Dusen | G06N 5/02 705/12 |

(Continued)

OTHER PUBLICATIONS

Charu C. Aggarwal, A Survey of Text Clustering Algorithms, Applied Mathematics and Computation vol. 185, Issue 2, (Aug. 2012), pp. 844-856.

(Continued)

*Primary Examiner* — Alexandria Y Bromell
(74) *Attorney, Agent, or Firm* — Gregory J Kirsch

(57) ABSTRACT

Embodiments may provide techniques for clustering using predefined anchors that take into account the knowledge about the anchors. For example, a method of clustering processing may be implemented in a computer comprising a processor, memory accessible by the processor, and computer program instructions stored in the memory and executable by the processor, the method comprising: receiving a plurality of points of data to be clustered and a plurality of predefined anchor data points and clustering the plurality of points of data and at least a subset of the predefined anchor data points. Further, the method may include creating a similarity function where anchor points pull stronger than regular points, such that they function as attractors.

9 Claims, 3 Drawing Sheets

(56) References Cited

U.S. PATENT DOCUMENTS

| | | | | |
|---|---|---|---|---|
| 2017/0330378 | A1* | 11/2017 | Kinstner | G06F 3/011 |
| | | | | 707/707 |
| 2018/0204111 | A1* | 7/2018 | Zadeh | G06N 3/0436 |
| | | | | 707/707 |
| 2019/0251467 | A1 | 8/2019 | Lokare et al. | |
| 2019/0318177 | A1* | 10/2019 | Steinberg | G01S 17/58 |
| | | | | 707/707 |
| 2019/0333212 | A1* | 10/2019 | Muhonen | G06T 7/0012 |
| | | | | 707/707 |
| 2020/0184278 | A1* | 6/2020 | Zadeh | G06K 9/6264 |
| | | | | 707/707 |

OTHER PUBLICATIONS

Zheng et al., Frontiers of Information Technology & Electronic Engineering, (2018), 19 (11): An anchor-based spectral clustering method*, pp. 1385-1396.

Pan Haiwei, et al. Incorporating domain knowledge into medical image clustering, Applied Mathematics and Computation vol. 185, Issue 2, (Feb. 15, 2007), pp. 844-856.

* cited by examiner

CLUSTERING ITEMS AROUND PREDEFINED ANCHORS

BACKGROUND

The present invention relates to techniques that provide clustering using predefined anchors that take into account the knowledge about the anchors. The anchors may be obtained from labelled data or from domain knowledge.

Clustering is a very common technique used in many fields, including machine learning, pattern recognition, and information retrieval. Basically, clustering is the task of dividing a set of objects into groups (clusters), such that objects in the same cluster are more similar to each other than objects from different clusters.

Most clustering algorithms assume no prior knowledge regarding preferred partitions of the data. However, in some cases, such knowledge exists, and variants may incorporate this knowledge into the clustering process. For example, in the family of constrained clustering algorithms, the prior knowledge is a set of constraints, which define relationships between pairs of data objects, usually must-link and cannot-link constraints.

In some cases, the prior knowledge may be given by a set of predefined points (anchors) in the data space, which the user would like the data objects to be clustered around. One conventional way to solve this problem is using nearest neighbor classification instead of clustering. However, using this approach there is no control on the resultant number of groups, which can be any number from 1 to the number of anchors. Clearly, using a standard clustering algorithm, which does not take into account the knowledge about the anchors, may be expected to yield a suboptimal solution.

Accordingly, a need arises for techniques that provide clustering using predefined anchors that take into account the knowledge about the anchors.

SUMMARY

Embodiments may provide techniques that provide clustering using predefined anchors that take into account the knowledge about the anchors.

For example, in an embodiment, a method of clustering processing may be implemented in a computer comprising a processor, memory accessible by the processor, and computer program instructions stored in the memory and executable by the processor, the method comprising: receiving a plurality of points of data to be clustered and a plurality of predefined anchor data points and clustering the plurality of points of data and at least a subset of the predefined anchor data points.

In embodiments, the method may further comprise determining for each data point of the plurality of points of data, a nearest neighbor among the predefined anchor data points and determining the subset of the predefined anchor data points, wherein each predefined anchor data point in the subset of the predefined anchor data points has at least one data point that is closest to the predefined anchor data point. Each nearest neighbor may be determined based on a similarity function defined between the data points. The clustering may comprise using a distance function in which anchor data points in the subset pull more strongly than other data points. The clustering may comprise using a distance function in which similarity to other data points of the predefined anchor data points in the subset is multiplied by a factor greater than one. The method may further comprise defining a semantic, description, or theme for each cluster using at least one predefined anchor data point in the cluster.

In an embodiment, a system for clustering processing may comprise a processor, memory accessible by the processor, and computer program instructions stored in the memory and executable by the processor to perform: receiving a plurality of points of data to be clustered and a plurality of predefined anchor data points and clustering the plurality of points of data and at least a subset of the predefined anchor data points.

In an embodiment, a computer program product for clustering processing may comprise a non-transitory computer readable storage having program instructions embodied therewith, the program instructions executable by a computer, to cause the computer to perform a method comprising: receiving a plurality of points of data to be clustered and a plurality of predefined anchor data points and clustering the plurality of points of data and at least a subset of the predefined anchor data points.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques that provide clustering using predefined anchors that take into account the knowledge about the anchors. Embodiments of such techniques may be relatively simple to implement, as they may utilize existing clustering processes without significant modifications. In embodiments, only the input data is modified (data-points and similarity function). Embodiments may utilize any clustering process and may works with any desired number of clusters. Embodiments may incorporate the anchor prior knowledge as opposed, for example, to conventional clustering processes and may handle a type of prior knowledge which is not handled by constrained clustering algorithms. Embodiments may utilize the cluster anchors to find the semantics, descriptions, themes, etc., of the different clusters. For example, one may calculate for each anchor in the cluster, its average distance from other points (non-anchors) in the cluster, and divide by the average distance of this anchor from the entire population of points. The anchor with the minimal value may serve as the cluster theme.

Figure 1:
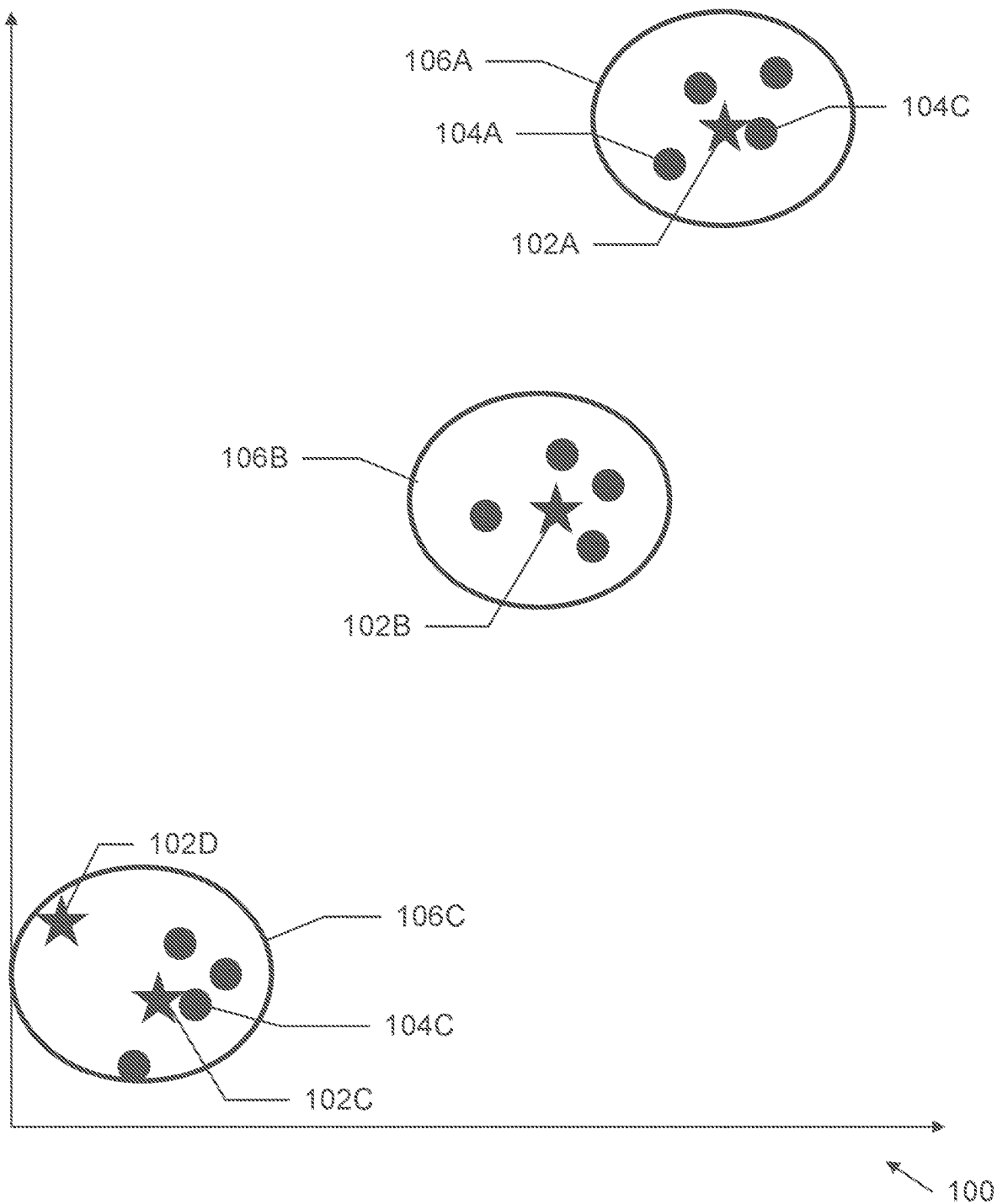
FIG. 1 illustrates an example of clustering according to embodiments of the present techniques.
Figure 2:
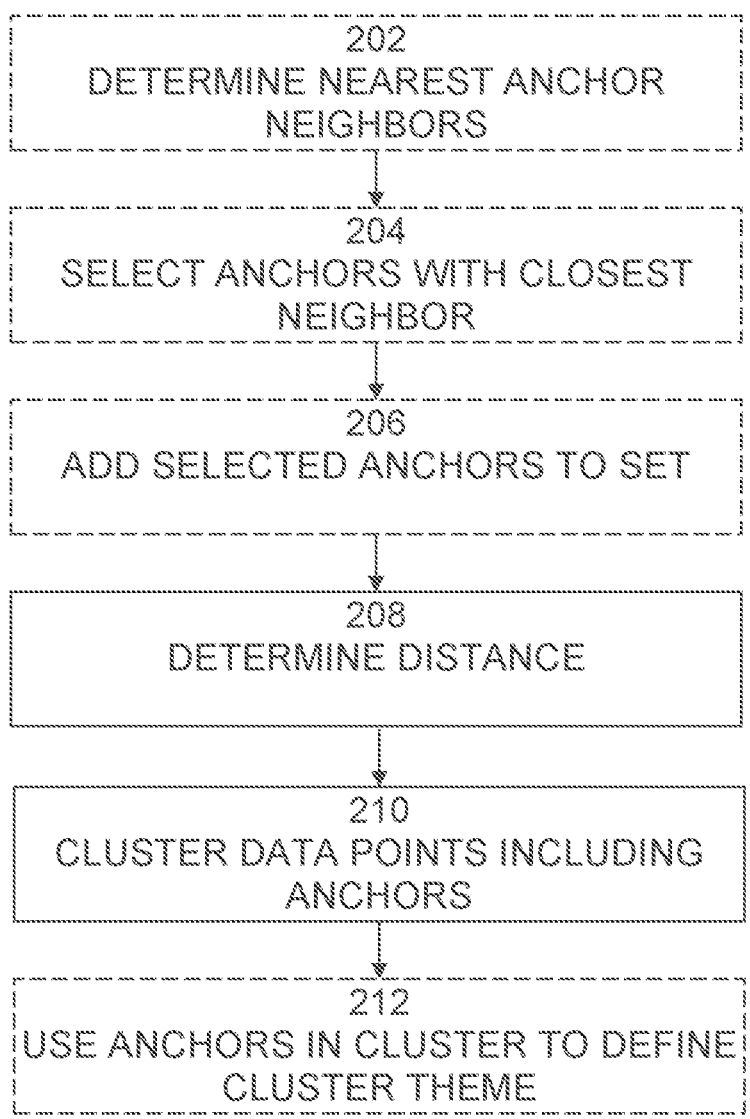
FIG. 2 is an exemplary flow diagram of a process of clustering according to embodiments of the present techniques.

An example of clustering 100 utilizing the present techniques is shown in FIG. 1. It is best viewed in conjunction with FIG. 2, which illustrates a process 200 of clustering utilizing the present techniques. As shown in FIG. 1, a plurality of data points 104A-Z to be clustered may include a plurality of anchor data points 102A-D. The objective of clustering process 200 is to cluster data points 104A-Z into a plurality of clusters 106A-C using anchor data points 102A-C. For example, the anchors may be obtained from labelled data or from domain knowledge.

Process 200 may include a number of optional steps, such as steps 202-206. If steps 202-206 are performed, then process 200 may begin with 208 in order to determine a distance among the data points 104A-Z and all provided anchor data points 102A-C. Then, at 202, for each data point 104A-Z, its nearest neighbor among all anchors may be determined. For example, the nearest neighbor anchor data point for data point 104C is anchor data point 102A, etc. At 204, out of all potential anchors, the subset of only those anchor data points 102A-C, not 102D, which have at least one data point that is closest to them may be selected. The nearest neighbor calculation may be performed based on a similarity function defined between the data points. For example, if the data points can be mapped onto vectors, then cosine similarity is a possible similarity function. The present techniques are not limited to a specific similarity metric, and may be applied to any similarity function. At 206, the anchor data points in the subset obtained above, anchor data points 102A-C, not 102D, may be added to the set of data points to be clustered.

If optional steps 202-206 have been performed, then 208 may be repeated to determine a distance among the data points 104A-Z and the included anchor data points 102A-C selected by steps 202-206. If optional steps 202-206 have not been performed, then process 200 begins with 208, a distance among the data points 104A-Z and all provided anchor data points 102A-C may be determined. The distance among the data points 104A-Z and the included or provided anchor data points 102A-C may be determined using a distance function that may include a factor that weights the anchor data points so that they "pull" more strongly than other data points. For example, for each included anchor data point 102A-C, their similarity to other data points may be multiplied by a factor f>1.

At 210, any clustering process may be used to cluster the data-points (including data points 104A-Z and included anchor data points 102A-C). However, use of the above-described factor may result in a non-metric similarity function, which may prevent the usage of clustering algorithms that require the similarity function to be metric. In embodiments, the clustering process may use the distance determined at 208, in which the anchor data point similarity to other data points may be multiplied by a factor f>1. Any clustering process may be used for this purpose, conventional, novel, standard, proprietary, etc. Accordingly, the clustering process may cluster data points 104A-Z and included anchor data points 102A-C into a plurality of clusters 106A-C. Embodiments may use the anchor data points within each cluster to define semantics, descriptions, themes, etc., for each cluster. For example, one may calculate for each anchor in the cluster, its average distance from other points (non-anchors) in the cluster, and divide by the average distance of this anchor from the entire population of points. The anchor with the minimal value may serve as the cluster theme.

Figure 3:
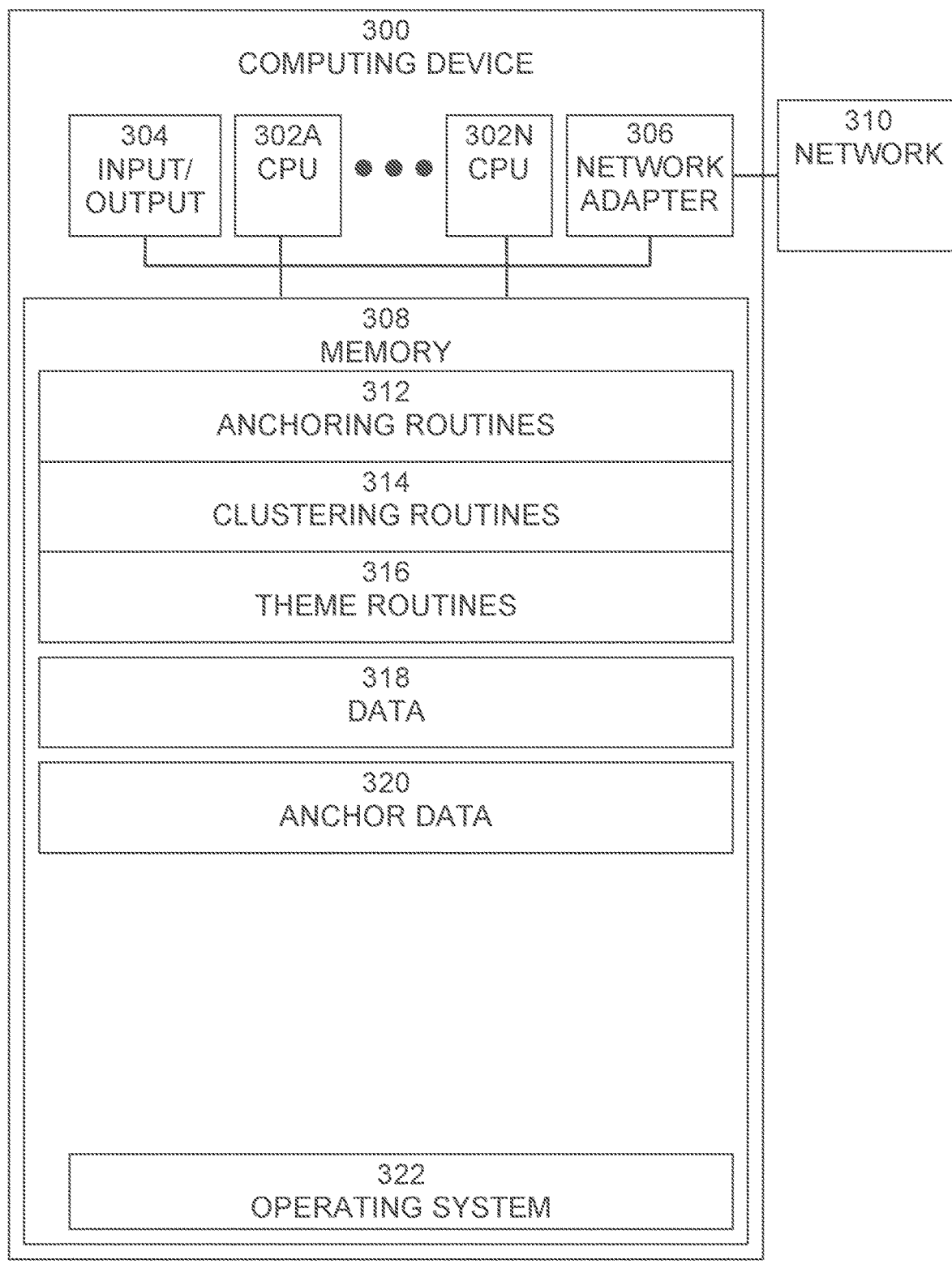
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include anchoring routines 312, clustering routines 314, theme routines 316, data 318, anchor data 320, and operating system 322. Anchoring routines 312 may include software routines to perform determination of included anchor points, as described above. Clustering routines 314 may include software routines to perform one or more clustering processes, as described above. Theme routines 316 may include software routines to use the anchor data points within each cluster to define semantics, descriptions, themes, etc., for each cluster, as described above. Data 318 may include a plurality of data points to be clustered, as described above.

Anchor data 320 may include anchor data points, as described above. Operating system 322 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of clustering processing, implemented in a computer comprising a processor, memory accessible by the processor, and computer program instructions stored in the memory and executable by the processor, the method comprising:
   receiving a plurality of data points to be clustered and a plurality of predefined anchor data points in a data space;
   clustering the plurality of data points and at least a subset of the plurality of predefined anchor data points,
   wherein the clustering comprises using a first distance function between a first data point of the plurality of data points and a second data point of the plurality of data points and using a second distance function between the first data point of the plurality of data points and a predefined anchor data point in the subset, and wherein the second distance function is equal to the first distance function divided by a factor greater than one;
   determining for each data point of the plurality of data points, a nearest neighbor among the plurality of predefined anchor data points; and
   determining the subset of the plurality of predefined anchor data points, wherein each predefined anchor data point in the subset of the plurality of predefined anchor data points has at least one data point that is closest to the predefined anchor data point.

2. The method of claim 1, wherein each nearest neighbor is determined based on the first distance function defined between the data points.

3. The method of claim 1, further comprising defining a semantic, description, or theme for each cluster using at least one predefined anchor data point in the cluster.

4. A system for clustering processing, the system comprising a processor, memory accessible by the processor, and computer program instructions stored in the memory and executable by the processor to perform:
   receiving a plurality of data points to be clustered and a plurality of predefined anchor data points in a data space;
   clustering the plurality of data points and at least a subset of the plurality of predefined anchor data points,
   wherein the clustering comprises using a first distance function between a first data point of the plurality of data points and a second data point of the plurality of data points and using a second distance function between the first data point of the plurality of data points and a predefined anchor data point in the subset, and wherein the second distance function is equal to the first distance function divided by a factor greater than one;
   determining for each data point of the plurality of data points, a nearest neighbor among the plurality of predefined anchor data points; and
   determining the subset of the plurality of predefined anchor data points, wherein each predefined anchor data point in the subset of the plurality of predefined anchor data points has at least one data point that is closest to the predefined anchor data point.

5. The system of claim 4, wherein each nearest neighbor is determined based on the first distance function defined between the data points.

6. The system of claim 4, further comprising defining a semantic, description, or theme for each cluster using at least one predefined anchor data point in the cluster.

7. A computer program product for clustering processing, the computer program product comprising a non-transitory computer readable storage having program instructions embodied therewith, the program instructions executable by a computer, to cause the computer to perform a method comprising:
   receiving a plurality of data points to be clustered and a plurality of predefined anchor data points in a data space;
   clustering the plurality of data points and at least a subset of the plurality of predefined anchor data points,
   wherein the clustering comprises using a first distance function between a first data point of the plurality of data points and a second data point of the plurality of data points and using a second distance function between the first data point of the plurality of data points and a predefined anchor data point in the sub set and wherein the second distance function is equal to the first distance function divided by a factor greater than one;
   determining for each data point of the plurality of data points, a nearest neighbor among the plurality of predefined anchor data points; and
   determining the subset of the plurality of predefined anchor data points, wherein each predefined anchor data point in the subset of the plurality of predefined anchor data points has at least one data point that is closest to the predefined anchor data point.

8. The computer program product of claim 7, wherein each nearest neighbor is determined based on the first distance function defined between the data points.

9. The computer program product of claim 7, further comprising defining a semantic, description, or theme for each cluster using at least one predefined anchor data point in the cluster.

* * * * *